United States Patent

[11] 3,607,898

[72] Inventor Robert J. Macher
 Elnora, N.Y.
[21] Appl. No. 851,752
[22] Filed Aug. 20, 1969
[45] Patented Sept. 21, 1971
[73] Assignee General Electric Company

[54] A PROCESS FOR PREPARING CYCLIC SYN-TETRAMETHYLTETRAVINYLTETRASILOXANE
 12 Claims, No Drawings

[52] U.S. Cl. .................................................. 260/448.2 E
[51] Int. Cl. .................................................. C07f 7/02
[50] Field of Search ...................................... 260/448.2 E

[56] References Cited
 UNITED STATES PATENTS

| | | | |
|---|---|---|---|
| 2,849,473 | 8/1958 | Bailey et al. ................. | 260/448.2 E |
| 2,979,519 | 4/1961 | Pierce et al. ................. | 260/448.2 E |
| 2,967,876 | 1/1961 | Bailey .......................... | 260/448.2 E |
| 3,188,300 | 6/1965 | Chalk ........................... | 260/448.2 E |
| 3,287,310 | 11/1966 | Omietanski ................. | 260/448.2 E |
| 3,484,469 | 12/1969 | Guinet et al. ................ | 260/448.2 E |
| 3,532,731 | 10/1970 | Hittmair et al. ............ | 260/448.2 E |

*Primary Examiner*—Tobias E. Levow
*Assistant Examiner*—Werten F. W. Bellamy
*Attorneys*—Donavon L. Favre, Frank L. Neuhauser, Oscar B. Waddell and Joseph B. Forman

ABSTRACT: Cyclic sym-tetramethyltetravinyltetrasiloxane is produced from a hydrolyzate, consisting primarily of methylvinylpolysiloxane employing lithium hydroxide, in combination with a cocatalyst. Heating of the hydrolyzate with lithium hydroxide in combination with one of the cocatalysts provides for rearrangement of the hydrolyzate into cyclic organopolysiloxanes and for a high yield of the cyclic sym-tetramethyltetravinyltetrasiloxane to be distilled from the heated mixture avoiding cleavage of the vinyl groups and gelation of the starting material.

A PROCESS FOR PREPARING CYCLIC SYM-TETRAMETHYLTETRAVINYLTETRASILOXANE

BACKGROUND OF THE INVENTION

Cyclic organopolysiloxanes have been found particularly valuable in the formation of organopolysiloxanes, especially long chain polymers. Exemplary of these long chain polymer raw materials which have proven invaluable are octamethylcyclotetrasiloxanes and hexaphenylcyclotrisiloxanes. Such materials may be homopolymerized to form long chain polymers with a single type of substituent on the silicon atoms of the chain, or they may be copolymerized to form organopolysiloxanes having silicon atoms substituted with differing groups.

It is often desirable to produce linear, long chain organopolysiloxanes which are readily cross-linkable. It has been found particularly advantageous to form such cross-linkable organopolysiloxanes by substituting some of the silicon atoms in the chain with a reactive group, such as the vinyl group. As with the octamethylcyclotetrasiloxane and hexaphenylcyclotrisiloxane, the most facile method of incorporating the vinyl substituted silicon members is through the coequilibration of a small amount of sym-tetramethyltetravinylcyclotetrasiloxane with other cyclic materials, such as the octamethylcyclotetrasiloxane and hexaphenylcyclotrisiloxane.

Previous methods of forming the sym-tetramethyltetravinylcyclotetrasiloxane have been extremely inefficient. Methylvinyldichlorosilane was hydrolzed, in the presence of a solvent, and the resulting reaction mixture distilled to recover the sym-tetramethyltetravinylcyclotetrasiloxane. However, the yields which resulted from such a process were extremely low, resulting in a very high cost for the desired cyclic polysiloxane. One reason for this high cost was that the byproducts of the reaction, such as, the sym-trimethyltrivinylcyclotrisiloxane, sym-pentamethylpentavinylcyclopentasiloxane, and the higher cyclics, were, of necessity, discarded. Prior processes did not allow for the employment of these materials as raw materials in the further preparation of the cyclic tetrasiloxane. Additionally, because the cyclic tetrasiloxane was recovered from the reaction mixture, relatively expensive solvents were required in the hydrolysis reaction.

Attempts had been made to "crack" or rearrange the hydrolyzate in the presence of a catalyst. Such processes are often employed in the formation of other cyclic polysiloxanes. However, when these techniques were attempted with the methylvinyldichlorosilane hydrolysis product, the result was a gel and the recovery of little, if any, cyclic tetrasiloxane.

SUMMARY OF THE INVENTION

In accordance with the present invention it has unexpectedly been discovered that the hydrolysis product of methylvinyldichlorosilane can be heated in the presence of lithium hydroxide, and particular cocatalysts, to rearrange the hydrolyzate into the cyclic organopolysiloxanes and provide yields of from 75% to 90% of the desired sym-tetramethyltetravinylcyclotetrasiloxane in a pure form. This compares with the former process where yields were generally in the range of 30% of the sym-tetramethyltetravinylcyclotetrasiloxane. In part, this additional yield is obtained because the process of the present invention allows the recycling of the lower and higher cyclic polysiloxanes resulting from the distillation. In subsequent processing these materials are again rearranged into a mixture of cyclopolysiloxanes, primarily the desired cyclotetrasiloxane.

The ability to rearrange to the desired cyclic tetrasiloxane in the presence of lithium hydroxide is particularly unexpected as the material has almost no catalytic effect and, in fact, will not act as an equilibration catalyst for organopolysiloxanes. Attempts to use lithium hydroxide, alone, in the distillation process of the present invention, provided no useful results.

However, when the lithium hydroxide is combined with a cocatalyst selected from the class consisting of alkyl polyethers having the formula:

(1) 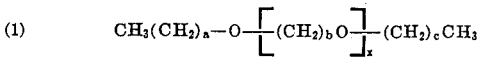

where $a$ is from 0 to 8, $b$ is from 1 to 3, $c$ is from 0 to 8, $x$ is from 2 to 6, the sum $a+c+bx$ is from 3 to 18 and the molecular weight is a maximum of 350, and triphenylphosphine oxide, the major product from the subsequent distillation is the desired sym-tetramethyltetravinylcyclotetrasiloxane. Further, employing the lithium hydroxide in conjunction with one of the referenced cocatalysts, the corresponding cyclotrisiloxanes, cyclopentasiloxanes, and higher cyclic polysiloxanes obtained from the distillation can be recycled for further rearrangement to provide additional sym-tetramethyltetravinylcyclotetrasiloxane.

The preferred polyether, because of its superior solvating ability and because it has a boiling point in the proper range, is the material known as tetraglyme which has the formula:

(2) $CH_3OCH_2CH_2OCH_2CH_2OCH_2CH_2OCH_2CH_2OCH_3$.

This material corresponds to the generic polyether of formula (1) where $a$ is 0, $b$ is 2, $c$ is 0, $x$ is 4, and the sum $a+c+bx$ is 8.

When employing the polyethers of formula (1) in conjunction with the lithium hydroxide, the materials are placed into a distillation pot along with a quantity of methylvinyldichlorosilane hydrolyzate. On attaining the proper pot temperature, the cyclic methylvinylpolysiloxanes are distilled overhead and the amount of the cyclic tetrasiloxane which is obtained in the overhead can be controlled, within limits, by varying the reflux ratio. Additional methylvinyldichlorosilane hydrolyzate can be fed to the distillation pot, as material is distilled overhead, so that the reaction can be run on a continuous basis. Distillation can be continued until such time as the material in the distillation pot begins to increase in viscosity due, in part, to a buildup of impurities which are contained in the hydrolyzate. Such impurities include polysiloxanes formed from organosilicon materials having a single hydrocarbon substituent on each silicon atom.

When employing triphenylphosphine oxide as the cocatalyst, the distillation is run in a similar manner, except for variations necessitated by the normally solid state of the triphenylphosphine oxide at the temperatures employed. In general, inexpensive hydrocarbon solvents, such as mineral oil, are employed in order to maintain distribution of the cocatalyst in the distillation mixture. The solvent is selected with a view toward its boiling point, such that it remains in the distillation pot, and is not, in general, carried over with the distilling cyclic polysiloxanes. The triphenylphosphine oxide-lithium hydroxide combination is not as strong a rearrangement catalyst as the polyether-lithium hydroxide and, consequently, processing is slower with this material.

DESCRIPTION OF THE PREFERRED EMBODIMENTS

In accordance with the present invention, the hydrolysis product of methylvinyldichlorosilane is heated in the presence of lithium hydroxide and a cocatalyst selected from the group of consisting of:

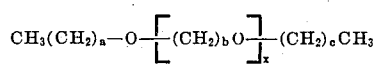

where $a$ is from 0 to 8, $b$ is from 1 to 3, $c$ is from 0 to 8, $x$ is from 2 to 6, the sum $a+c+bx$ is from 3 to 18 and the molecular weight is a maximum of 350, and triphenylphosphine oxide The heating is sufficient to rearrange the polysiloxane hydrolysis product into cyclic sym-polymethylpolyvinylcyclopolysiloxanes, primarily the cyclic tetrasiloxane, which are distilled from the heated mixture.

When employing the polyether for formula (1) in conjunction with the lithium hydroxide, the mixture in the distillation pot contains at least one-half part of the polyether for each part of the polysiloxane hydrolysis product. Except as limited by problems of equipment utilization, there is no upper limit to the amount of solvent which can be employed in conjunction with the organopolysiloxane hydrolysis product. The preferred ratio of materials is about 1 part, by weight, of the polyether for each part, by weight, of the organopolysiloxane hydrolysis product. Lithium hydroxide is employed in amounts of from about one-half to 2%, by weight, based upon the total mixture in the distillation pot.

The numerical definitions given above for $a$, $b$, $c$, and $x$ are, of course, averages as mixtures of materials within the formula set forth above can be employed. The preferred polyether for use in this process is that known as tetraglyme having the formula:

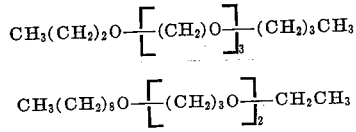

The solvating effect of this polyether on the organopolysiloxane hydrolysis product is particularly desirable, and the boiling point is such that the polyether preferentially remains in the distillation pot, as the cyclic polysiloxanes are distilled overhead. Other useful materials within the polyether definition of formula (1) include diglyme of formula:

$CH_3OCH_2CH_2OCH_2CH_2OCH_3$;

corresponding to formula (1) where $a$ is 0, $b$ is 2, $c$ is 0, $x$ is 2, and the sum $a+c+bx$ is 4; and triglyme of formula:

$CH_3OCH_2CH_2OCH_2CH_2OCH_2CH_2OCH_3$;

which corresponds to formula (1) where $a$ is 0, $b$ is 2, $c$ is 0, $x$ is 3, and the sum $a+c+bx$ is 6.

Additionally, the polyether of formula (1) can be a mixture of polyethers, similar in form to diglyme, triglyme, and tetraglyme, where $x$ is in a range of from 3 to 8 or 4 to 8, for example, so long as the average $x$ is 6 or less. Other useful polyethers within the definition of formula (1) are those having the formula:

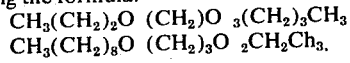

etc.

When employing the triphenylphosphine oxide as the cocatalyst for the lithium hydroxide, a high boiling hydrocarbon solvent is used in the distillation pot along with the organopolysitoxane hydrolysis product. This high boiling hdyrocarbon solvent can be employed in the same ratios as was the polyether with the organopolysiloxane hydrolysis product, when employing the polyether as the cocatalyst. Among the solvents which can be used are those sold under the trade names Nujol, Primol D, Bayol 35, and Bayol 90. Nujol, a high molecular weight white mineral oil, is an essentially paraffinic material with a viscosity, at 100° F., of 360–390 Saybolt seconds, and a specific gravity at 60° F. of 0.880–0.900. Primol D, also a high molecular weight white mineral oil, contains approximately 36% naphthenes and 64% paraffins and has a viscosity of 369 Saybolt seconds, at 100° F. and 54.2 Saybolt seconds at 210° F., with a specific gravity of about 0.8836 at 60° F. Bayol 35, a refined kerosene, is composed of approximately 3% aromatics, 29% naphthenes, 66% paraffins, and 2% olefins, and has a viscosity of 35 Saybolt seconds at 100° F. and a specific gravity of about 0.780 at 60° F. Bayol 90, a medium molecular weight white mineral oil, with a viscosity of 87 Saybolt seconds at 100° F. and 38 Saybolt seconds at 210° F., and a specific gravity of about 0.8677 at 60° F., has a composition of approximately 53% naphthenes and 47% paraffins.

With the triphenylphosphine oxide as cocatalyst, both lithium hydroxide and triphenylphosphine oxide can be employed in amounts of from about one half to 2%. Preferably, each is employed in amounts of about 1%.

After hydrolysis of the methylvinyltrichlorosilane, and prior to its introduction into the distillation pot, the hydrolysis reaction product is phase separated to remove the organosilicon material from the water. The acid remaining in the organosilicon material is then neutralized and the solvent employed in the hydrolysis is stripped from the organosilicone. The resulting hydrolysis product, lithium hydroxide, cocatalyst, and additional solvent, when required, are then placed into the distillation pot. The order of addition is immaterial.

Heating of the contents of the distillation pot is then started until a pot temperature of approximately 150° to 160° C. is achieved. This is the preferred pot temperature when a vacuum of about 20 mm. is used. The distillation can be run at temperatures varying from 125° to 175° C. and at pressures of from 10 to 50 mm. At the lower temperatures, the distillation rate is lower, and as the higher temperatures are reached, foaming increases to such a degree as to render any higher temperatures impractical.

The reflux ratio during distillation is adjusted so as to maintain a ratio of sym-tetramethyltetravinylcyclotetrasiloxane to sym-trimethyltrivinylcyclotrisiloxane of from about 2:1 to 8:1.

The various cyclic methylvinylpolysiloxanes recovered by the rearrangement and distillation are then separated by fractional distillation and the sym-trimethyltrivinylcyclotrisiloxane, sym-pentamethylpentavinylcyclopentasiloxane, and higher cyclics are recycled and added to further hydrolysis runs for rearrangement, redistillation and formation into the desired sym-tetramethyltetravinylcyclotetrasiloxane. Employing these recycles, the yields of the sym-tetramethyltetravinylcyclotetrasiloxane range from about 75% to 90% to the original input hydrolysis product.

The following examples are illustrative of the process of the present invention and should not be considered as limiting in any way the full scope of the invention as covered by the appended claims. All parts in the following examples are by weight.

EXAMPLE 1

Into a distillation pot were placed 150 parts of sym-pentamethylpentavinylcyclopentasiloxane, 150 parts of bis 2-(2-methoxyethoxy)-ethylether [tetraglyme], and 3 parts lithium hydroxide. The pressure on the system was reduced to 20 mm. and the distillation pot contents were heated to attain a pot temperature of about 155° C. When the head temperature in the associated distillation column reached 120° C., takeoff of the product was begun and 139 parts of overhead product were collected, representing a 92% yield, based upon the original input. This product, analyzed by vapor phase chromatography and infrared spectroscopy, was a blend of sym-trimethyltrivinylcyclotrisiloxane, sym-tetramethyltetravinylcyclotetrasiloxane, and sym-pentamethylpentavinylcyclopentasiloxane-tetraglyme in a ratio of 4:8:1. The cyclotrisiloxane and cyclopentasiloxane-tetraglyme were recyclced into later distillations.

EXAMPLE 2

Into a reaction vessel were placed 2,000 parts of methylvinyldichlorosilane hydrolysis product which, following hydrolysis had been separated from the water layer, solvent-stripped and azeotroped dry. To the hydrolysis product were added 2,000 parts of tetraglyme and 80 parts of lithium hydroxide. The pressure on the system was reduced to 30 mm. and the contents of the distillation pot heated to 160° C. When a reasonable reflux was attained, overhead takeoff was begun. Additional hydrolyzate was added to the distillation pot at a rate equal to the overhead takeoff. The feeding of additional hydrolyzate was continued for 20 hours employing a total of 7,621 parts of the hydrolzate; distillation takeoff continued for an additional 4 hours. A quantity of 6,454 parts of product were collected, 85% yield based upon the feed. Analysis of the product showed a mixture of sym-tetramethyltetravinylcyclotetrasiloxane and sym-trimethyltrivinyltrisiloxane in a ratio of 6:1. A portion of this mixture was fractionally distilled and the identity of the products confirmed by chromatographic and spectroscopic analysis.

EXAMPLE 3

Into a distillation pot were placed 100 parts of sym-pentamethylpentavinylcyclopentasiloxane, 100 parts of mineral oil, 2 parts triphenylphosphine oxide, and 2 parts lithium hydroxide. Pressure on the system was reduced to 20 mm. and the contents of the distillation pot were warmed to 155° C.

When reflux started, takeoff was begun and 59 parts of product were recovered. This material was analyzed by vapor phase chromatography and infrared spectroscopy to show a mixture of sym-trimethyltrivinylcyclotrisiloxane, sym-tetramethyltetravinylcyclotetrasiloxane, and sym-pentamethylpentavinylcyclopentasiloxane in a ratio of 1:4:1. After a fractional distillation to recover the desired sym-tetramethyltetravinylcyclotetrasiloxane, the cyclotrisiloxane and cyclopentasiloxane were recycled into later distillations.

EXAMPLE 4

A quantity of 150 parts tetraglyme, 150 parts methylvinyldichlorosilane hydrolyzate, processed as described in Example 2, and 3 parts lithium hydroxide were placed into a distillation pot. The pressure on the distillation system was reduced to 30 mm. and the contents of the distillation pot were heated to 160° C. A reflux ratio of 5:1 was established, in the associated distillation column, maintaining head temperature at 120° C. 93 at 120° Additional methylvinyldichlorosilane hydrolyzate was fed to the distillation pot at a rate corresponding to the rate of overhead takeoff. The amount of hydrolyzate added during the run was 403 parts and a quantity of 492 parts of material was taken overhead. The yield of cyclic material was 89.5% based upon the total feed, and 80.4% of this was sym-tetramethyltetravinylcyclotetrasiloxane.

EXAMPLE 5-11

In place of the lithium hydroxide catalyst and cocatalysts employed in the previous examples, other catalysts and cocatalysts were employed in similar runs, with results as indicated:

| Example No. | Catalyst | Cocatalyst | Result |
|---|---|---|---|
| 5 | 2% Ba(OH)$_2$ | None | No reaction. |
| 6 | 1% Ba(OH)$_2$ and 1%KOH | do | Cleavage of vinyls and gelation of distillation pot contents. |
| 7 | 1% KOH | 1% HMPA[1] | Gelation of pot contents. |
| 8 | 1% Ba(OH)$_2$ | 1% HMPA | No reaction. |
| 9 | 1% LiOH | 1% HMPA | HMPA could not be separated from the material, and there was no product take-off. |
| 10 | 1% LiOH | 1% OMPA[2] | No reaction. |
| 11 | | 2% triphenylphosphine oxide. | Do. |

[1] Hexamethylphosphoramide
[2] Octamethylpyrophosphoramide

Results similar to those cited in Examples 5 through 11 were obtained when polyethers having hydroxyl terminal groups were employed in place of the polyethers of formula (1) and when acids were employed in place of the lithium hydroxide catalyst.

Thus, a facil method of producing sym-tetramethyltetravinylcyclotetrasiloxane from methylvinyldichlorosilane hydrolysis products, or from other sym-methylvinylcyclopolysiloxanes has been shown. The rearrangement process is applicable to the formation of the sym-tetramethyltetravinylcyclotetrasiloxane in high yields from a variety of methylvinylpolysiloxane materials, both cyclic and linear, employing a particular catalyst and particular cocatalysts.

What I claim as new and desire to secure by Letters Patent of the United States is:

1. A process for the formation of sym-tetramethyltetravinylcyclotetrasiloxane comprising the heating of a methylvinylpolysiloxane material in the presence of lithium hydroxide and, as a cocatalyst, a member selected from the class consisting of:

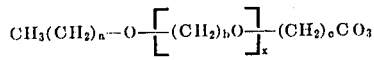

where $a$ is from 0 to 8, $b$ is from 1 to 3, $c$ is from 0 to 8, $x$ is from 2 to 6, the sum $a+c+bx$ is from 3 to 18 and the molecular weight is a maximum of 350, and triphenylphosphine oxide.

2. A process for forming sym-tetramethyltetravinylcyclotetrasiloxane from the hydrolysis product of methylvinyldichlorosilane comprising heating the hydrolysis product in the presence of lithium hydroxide and a cocatalyst selected from the class consisting of:

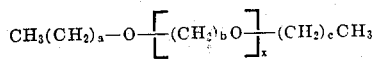

where $a$ is from 0 to 8, $b$ is from 1 to 3, $c$ is from 0 to 8, $x$ is from 2 to 6, the sum $a+c+bx$ is from 3 to 18 and the molecular weight is a maximum of 350, and triphenylphosphine oxide.

3. A process for forming sym-tetramethyltetravinylcyclotetrasiloxane from the hydrolysis product of methylvinyldichlorosilane comprising:
  1. forming a mixture comprising:
     a. 1 part of the dried hydrolysis product of methylvinyldichlorosilane;
     b. at least one-half part of a polyether having the formula:

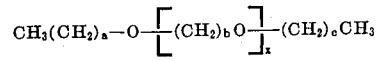

where $a$ is from 0 to 8, $b$ is from 1 to 3, $c$ is from 0 to 8, $x$ is from 2 to 6, the sum $a+c+bx$ is from 3 to 18 and the molecular weight is a maximum of 350; and
     c. from 0.5% to 2% by weight, lithium hydroxide, based on the total of the hydrolysis product and polyether;
  2. heating the mixture; and
  3. distilling from the heated mixture a blend of sym-methylvinylcyclopolysiloxanes.

4. The process of claim 3 wherein hydrolysis product is added to the distillation mixture as cyclic polysiloxanes are removed.

5. The process of claim 3 wherein the polyether is:
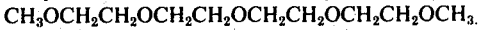

6. The process of claim 3 wherein the amount of polyether is equal to the amount of hydrolysis product.

7. The process of claim 3 wherein a portion of the hydrolysis product of methylvinyldichlorosilane is provided by sym-polymethylpolyvinylcyclopolysiloxanes.

8. A process for forming sym-tetramethyltetravinylcyclotetrasiloxane from the hydrolysis product of methylvinyldichlorosilane comprising:
  1. forming a mixture comprising:
     a. 1 part of the dried hydrolysis product of methyvinyldichlorosilane;
     b. at least one-half part of a high boiling solvent;
     c. from 0.5% to 2% lithium hydroxide, by weight, based on the total of (a) and (b); and
     d. from 0.5% to 2% triphenylphosphine oxide, by weight, based on the total of (a) and (b);
  2. heating the mixture; and
  3. distilling from the mixture a mixture of sym-methylvinylcyclopolysiloxanes.

9. The process of claim 8 wherein the solvent is a high boiling mineral oil solvent.

10. The process of claim 8 wherein hydrolysis product is added to the distillation mixture as cyclic polysiloxanes are removed.

11. The process of claim 8 wherein the lithium hydroxide is employed in an amount of approximately 1% and the triphenylphosphine oxide is employed in an amount of approximately 1%.

12. The process of claim 8 wherein a portion of the hydrolysis product of methylvinyldichlorosilane is provided by sym-polymethylpolyvinylcyclopolysiloxanes.